July 23, 1935.　　D. M. BLACKBURN　　2,009,219
SHAKING SCREEN
Filed July 1, 1933　　3 Sheets-Sheet 2
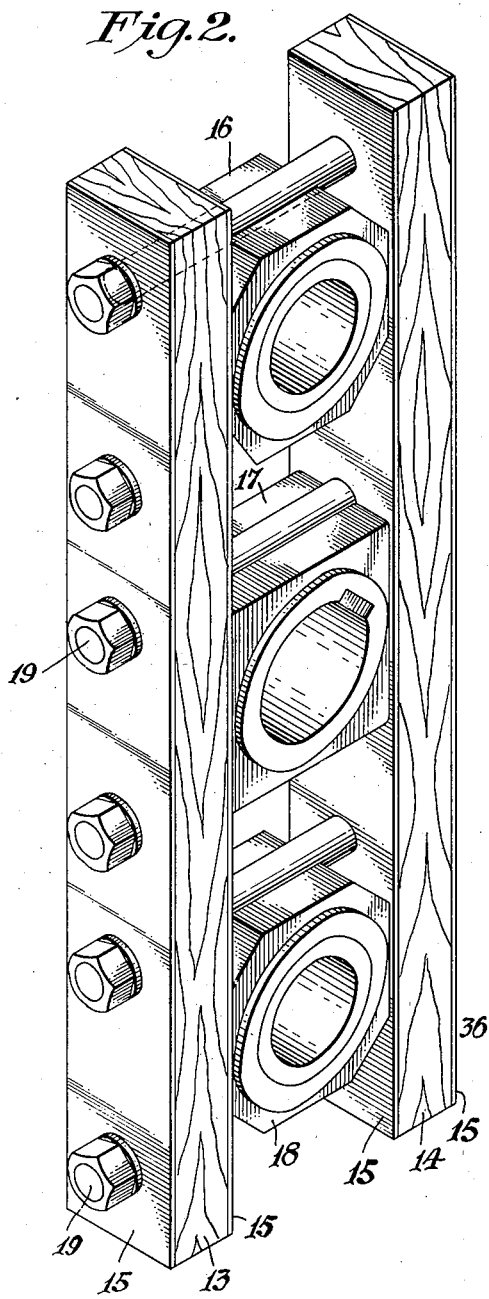
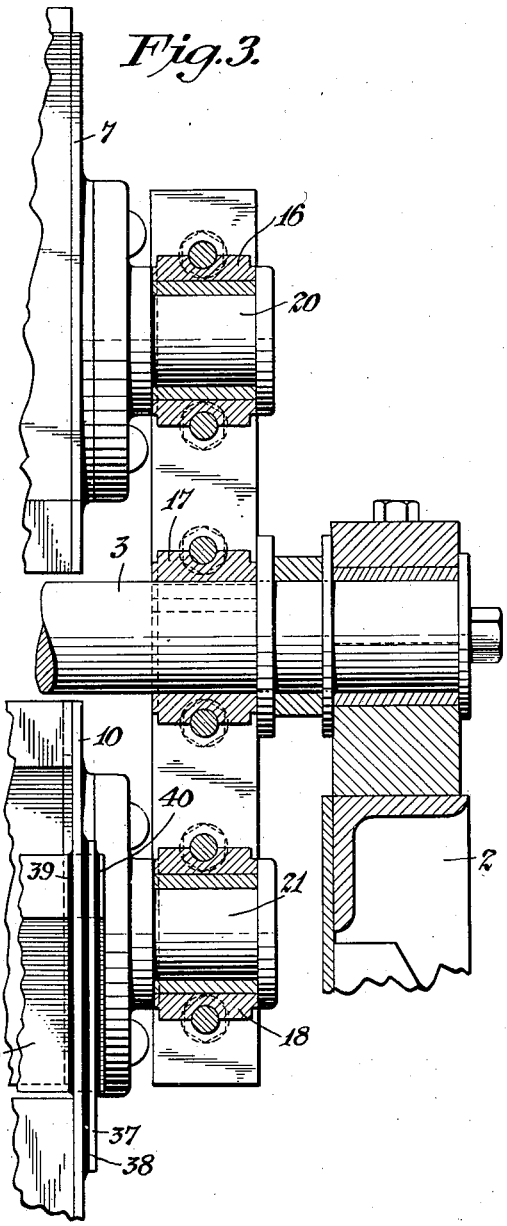
INVENTOR
Daniel M. Blackburn
BY Henry Van Arsdale
ATTORNEY July 23, 1935.  D. M. BLACKBURN  2,009,219
SHAKING SCREEN
Filed July 1, 1933  3 Sheets-Sheet 3
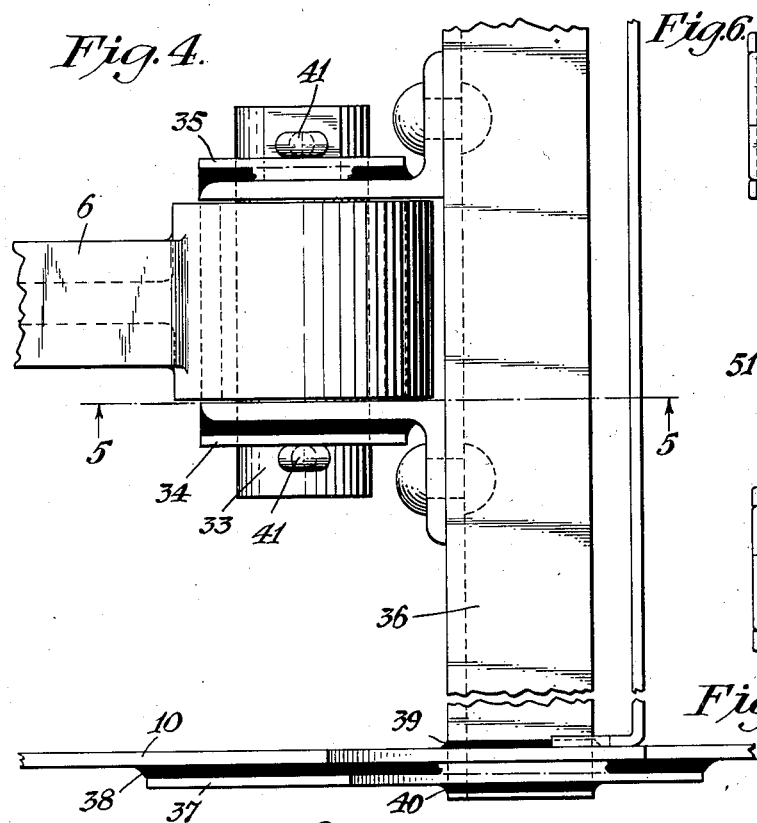
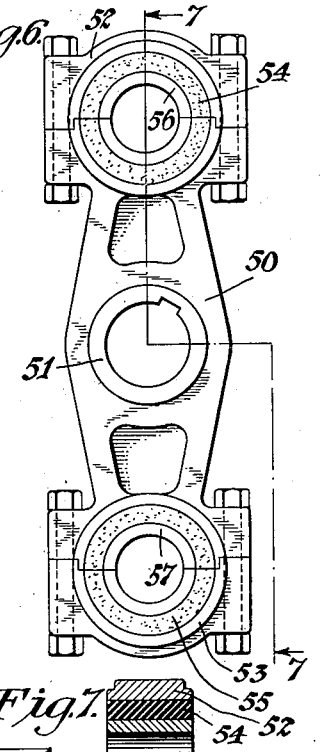
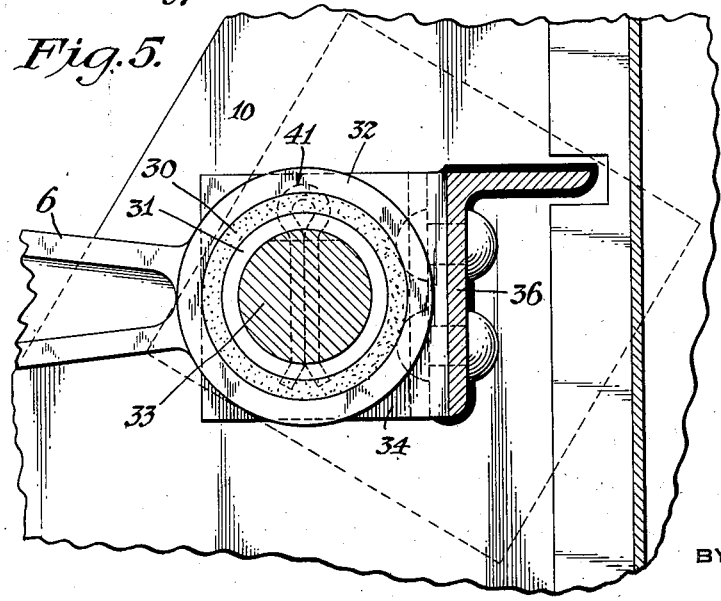
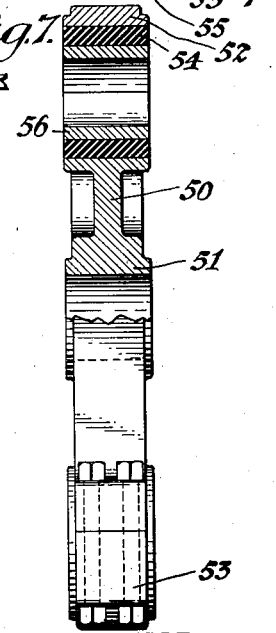
INVENTOR
Daniel M. Blackburn
BY Henry Van Arsdale
ATTORNEY Patented July 23, 1935

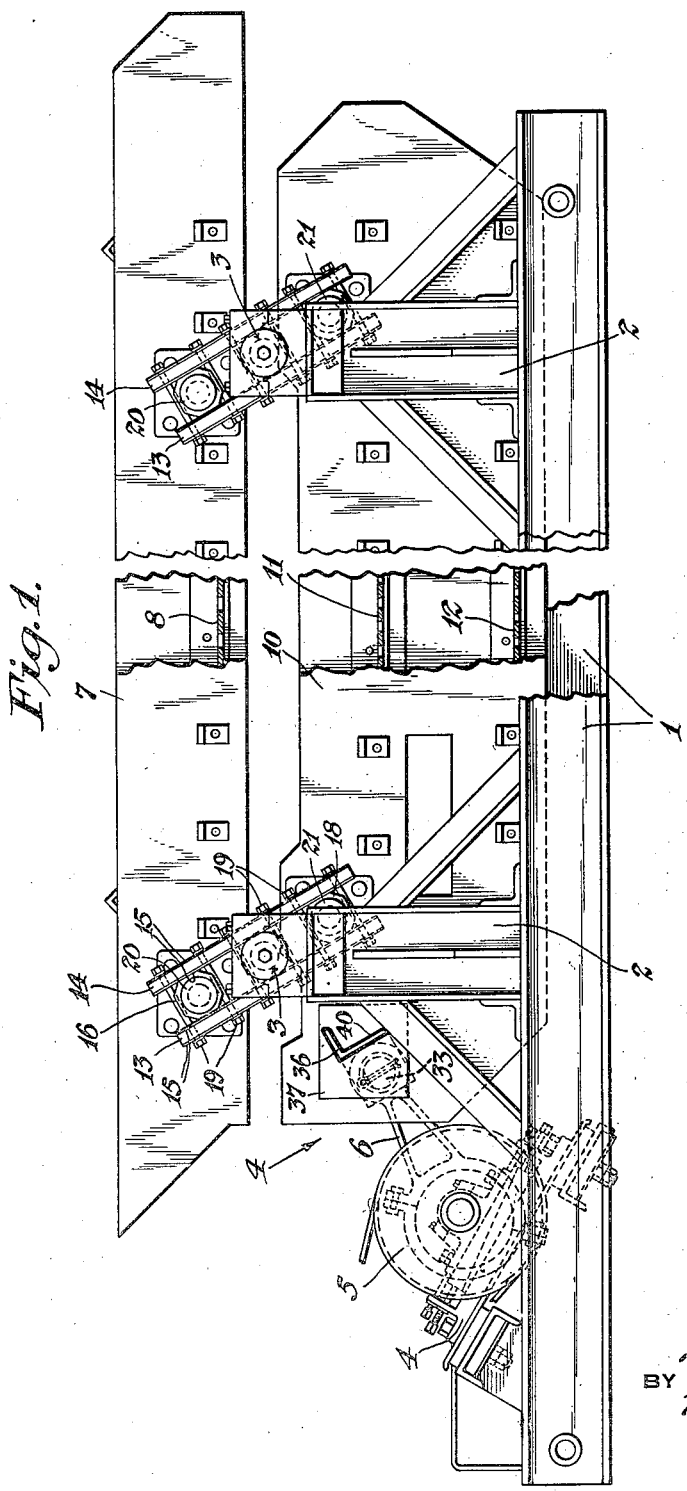

2,009,219

UNITED STATES PATENT OFFICE 2,009,219

SHAKING SCREEN

Daniel M. Blackburn, Carbondale, Pa., assignor to Hendrick Manufacturing Company, Carbondale, Pa., a corporation of Pennsylvania Application July 1, 1933, Serial No. 678,565

2 Claims. (Cl. 209—415)

This invention relates to shaking screens and more particularly to shaking screens of the power type adapted to operate on heavy materials such as stone, coal, and the like, and the principal object of this invention is to provide an improvement in shaking screen construction whereby the perforations in the screens are kept clear by avoiding lodgment of material in the screen perforations and the clogging of the screens thereby.

Another object of this invention is to provide a shaking screen in which the screens have a quick and sharp return snap or whip at the end of each forward and backward stroke, which tends to throw out of the screen perforations any material that may tend to become lodged therein and thus to keep the screen perforations clear.

A further object of this invention is to provide simple, sturdy, durable, and effective hanger arms whereby the snap or whip referred to is obtained and to provide a simple, sturdy, and durable connection between the power drive of the screen and the screens which does not obstruct or interfere with the whip or snap movement of the screens which tends to keep the screen perforations clear of material.

Other objects of this invention will be in part obvious and in part pointed out hereinafter.

In accordance with this invention, the hanger arms and the connection between the power drive and the screens are sufficiently rigid so that there is practically no flexing of the hanger arms or the connection during the backward and forward strokes of the screens except at the extreme limits of the strokes and the hanger arms and the drive connections to the screen have just enough resiliency that at the extreme end of each forward and backward stroke of the screens the screens are given a quick return snap or whip. The snap or whip is almost momentary but has considerable force and power and is sufficient to dislodge material from the screen perforations and to keep the perforations clear.

In order that a clearer understanding of this invention may be had, attention is hereby directed to the accompanying drawings forming a part of this application and illustrating certain possible embodiments of this invention and in which:

Fig. 1 is a side elevation of a shaking screen embodying this invention, certain parts being broken away, others shown in section, and others indicated by dotted lines to more clearly bring out certain details of the construction.

Fig. 2 is an enlarged perspective view of one of the hanger arms.

Fig. 3 is an enlarged rear view of a fragment of the screen showing one of the hanger arms in longitudinal section and proximate parts of the screen, certain of these parts being shown in fragment and others shown in section.

Fig. 4 is an enlarged top view of the drive connection and proximate parts, certain parts being shown in fragment.

Fig. 5 is a vertical sectional view through the drive connection and is taken on the line 5—5 of Fig. 4.

Fig. 6 is a side view of a hanger arm of modified construction; and

Fig. 7 is a front view thereof partly in section as indicated by the line 7—7 of Fig. 6.

Similar reference characters refer to similar parts throughout the several views of the drawings.

Referring to the drawings, the general screen assembly as shown in Fig. 1 comprises a suitable supporting framework comprising base members 1, uprights or stanchions 2, supporting rock shafts 3, for the hanger arms, and a platform or base 4 supporting the power drive assembly 5 for the screen, this power drive including a reciprocating connecting rod 6.

In the construction illustrated there is an upper trough frame 7 having a screen 8 and a lower trough frame 10 having two screens 11 and 12, one above the other. On each rock shaft 3 and at each side of these frames there is a hanger comprising two strips of wood 13 and 14 each faced on two opposite sides with strips of steel 15. These two side members of the hanger are clamped tightly against the opposite sides of three bearing blocks 16, 17, and 18, by means of bolts 19, which extend through both side members and preferably seat in grooves provided therefor in the upper and lower surfaces of the bearing blocks, as shown best in Figs. 2 and 3. The center bearing block 17 receives the rock shaft 3, the upper bearing block 16 receives the stud 20 of the upper trough frame and the lower bearing block 18 receives the stud 21 of the lower trough frame.

The steel faced wooden side members of the hangers have the characteristic of giving to the trough frames and the screens therein the quick and sharp return snap and whip at the end of each stroke which serves so well to dislodge material from the screen perforations and to keep the screens clear.

Obviously, the side strips 13 and 14 may be made as long as desired and either the bottom or the top deck of the screen, or both, can be raised and lowered by changing the bearing blocks 16 and 18 and the bolts 19 to different positions.

To permit the lower trough frame 10 and the screens 11 and 12 thereof to have the full benefit of the screen clearing whip or snap motion, the connection between the connecting rod 6 and the frame 10 is resilient to the required or the desired degree. As shown in the drawings this may be accomplished by interposing an annular rubber bushing 30 between an inner annular bronze bushing 31 and the outer hub or yoke 32 of the coupling at the outer end of the connecting rod 6. This coupling receives a shaft 33 supported between two brackets 34 and 35 carried on a metal angle strip 36 which extends across the end of the trough from 10 and has its ends seated in perforations in the side plates of frame 10 and in reenforcing plates 37 welded thereto, as at 38, and the ends of angle 36 are welded to these plates as at 39 and 40. A wooden beam may be used instead of the angle 36. Shaft 33 may be held in place by cotter pins 41.

Although both the resilient bushing 30 and angle member 36 are shown as incorporated in the same construction, and may be so employed, either one may be used without the other and with satisfactory results. A connection as described eliminates and absorbs shocks and jars on the drive and permits the screen to be operated more effectively and at higher speeds.

In Figs. 6 and 7 there is illustrated a possible modified construction of a resilient hanger arm which may be used instead of the specific construction previously described. As shown, the hanger arm has a longitudinal body portion 50 having a center bearing portion 51 adapted to receive a rock shaft 3 of the shaking screen, and having a bearing hub or yoke 52 and 53 at each opposite end. These end bearings include an annular rubber bushing 54, 55, interposed between an inner bronze bushing 56, 57 and the outer rim of the hub or yoke 52, 53. These rubber bushings 54, 55 give the desired resiliency to the hanger and accomplish the purpose of giving to the screen frames and to the screens therein the quick whip or snap action which tends to keep the screen perforations clear of material.

From the above it will be apparent that the desired results are obtained by this invention, and that the parts employed are sturdy, strong, durable, simple, and inexpensive. As many changes could be made in the above construction and as many apparently widely different embodiments of this invention could be made without departing from the scope thereof, it is understood that all matter contained in the above description or shown in the accompanying drawings be interpreted as illustrative and not in a limiting sense.

What I claim is:

1. A screen hanger of the character described including a plurality of spaced bearing blocks, resilient supporting strips disposed against opposite sides of said blocks, and bolts extending through both said strips fastening the strips tightly against the blocks, the upper and lower surfaces of said blocks having grooves and the shanks of said bolts seating in the said grooves.

2. A screen hanger of the character described including a plurality of spaced bearing blocks, resilient wooden supporting strips disposed against opposite sides of said blocks, and having metal facing strips on their inner and outer faces, and bolts extending through both said strips and the said facing strips fastening the strips tightly against the blocks.

DANIEL M. BLACKBURN